United States Patent [19]
Adams

[11] 3,983,763
[45] Oct. 5, 1976

[54] PINION FOR VARIABLE RATIO RACK AND PINION STEERING GEAR

[75] Inventor: Frederick John Adams, Campton, England

[73] Assignee: Cam Gears Limited, Hitchin, England

[22] Filed: June 27, 1975

[21] Appl. No.: 590,955

[30] Foreign Application Priority Data

July 11, 1974 United Kingdom............... 30789/74

[52] U.S. Cl.................................... 74/393; 74/401; 74/497; 74/498
[51] Int. Cl.².................. F16H 35/06; F16H 35/08; B62D 1/20
[58] Field of Search............ 74/393, 401, 400, 403, 74/402, 498, 497, 395

[56] References Cited
UNITED STATES PATENTS

| | | |
|---|---|---|
| 1,772,372 | 8/1930 | Tierney, Jr........................ 74/395 X |
| 2,260,402 | 10/1941 | Potoevin........................ 74/395 UX |
| 2,881,628 | 4/1959 | Hannon................................ 74/393 |

Primary Examiner—Leonard H. Gerin

[57] ABSTRACT

A drive transmission mechanism comprises an axially fixed rotatable primary pinion, an intermediate pinion rotatable in response to the primary pinion to effect rotation of a secondary pinion, and cam means responsive to rotation of the primary pinion to effect axial displacement of the intermediate pinion during its rotation. The rotary drive is transmitted from the primary pinion to the secondary pinion by at least one set of mutually engaging helical teeth. The axial displacement of the intermediate pinion produces a variation in the movement ratio between the primary and secondary pinions.

10 Claims, 1 Drawing Figure

U.S. Patent  Oct. 5, 1976  3,983,763
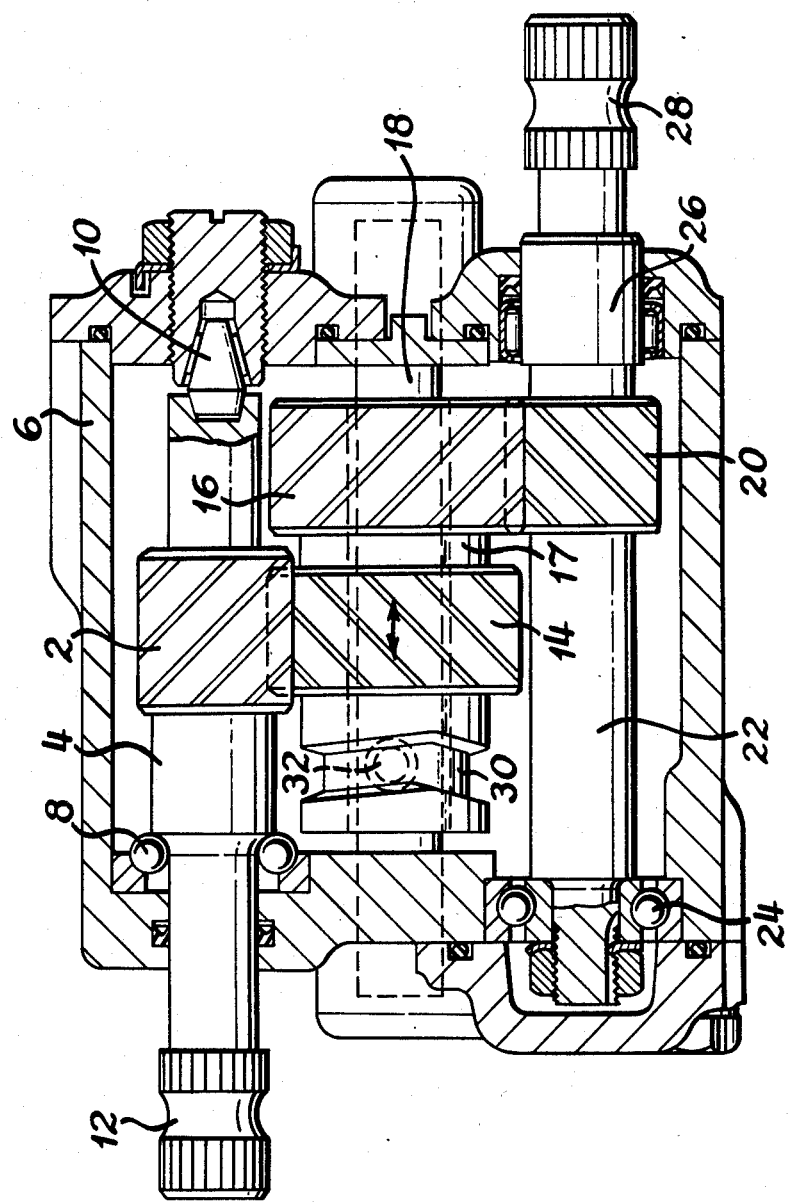

PINION FOR VARIABLE RATIO RACK AND PINION STEERING GEAR

The present invention relates to a drive transmission mechanism in which rotation of a primary pinion produces rotation of a secondary pinion.

The invention is particularly concerned with a drive transmission mechanism which enables the movement ratio between the primary and secondary pinion to vary over a chosen range. The term "movement ratio" is herein defined as meaning the rotation of the secondary pinion produced by a unit rotation of the primary pinion.

It is envisaged that the mechanism of the invention will have many applications, such as for example, the machine tool industry. One particular application is to the steering mechanism for vehicles, in which the mechanism can be used to vary the degree of turn of the vehicle front road wheels produced by unit rotation of the vehicle steering wheel. One previously proposed way of achieving this variation with a rack and pinion steering mechanism is to arrange the pinion in direct engagement with a rack by means of teeth which are inclined to the rotational axis of the pinion, and to effect controlled axial displacement of the pinion during its rotation.

The pinion is coupled to one end of a steering column having a steering wheel at its other end, and consequently the steering column and steering wheel are moved axially with the pinion. One disadvantage of this arrangement is that this axial movement of the steering column and steering wheel can produce difficulties particularly with a power-assisted steering system. Another disadvantage is that this system is only suitable for use with rack and pinion steering mechanisms.

It is an aim of the invention to at least reduce the above-mentioned disadvantages, and according to the present invention there is provided a drive transmission mechanism comprising an axially fixed rotatable primary pinion, an intermediate pinion rotatable in response to the primary pinion to effect rotation of a secondary pinion, and cam means responsive to rotation of the primary pinion to effect axial displacement of the intermediate pinion during its rotation, in which rotary drive is transmitted from said primary pinion to said secondary pinion by at least one set of mutually engaging helical teeth whereby said axial displacement of the intermediate pinion produces a variation in the movement ratio between the primary and the secondary pinions.

The intermediate pinion may engage the primary pinion, and may be fixedly connected to a gear wheel which engages the secondary pinion.

In one arrangement, the primary pinion and intermediate pinion are coupled by mutually engaging straight teeth, and the gear wheel and secondary pinion are coupled by mutually engaging helical teeth. In another arrangement, the primary pinion and intermediate pinion are coupled by mutually engaging helical teeth, and the gear wheel and secondary pinion are coupled by mutually engaging straight teeth. In a further arrangement, all the mutually engaging teeth may be helical.

The cam means may comprise a mutually engaging cam projection and a cam recess which are relatively rotatable on rotation of the primary pinion. In one arrangement, the recess is rotatable with the intermediate pinion. The recess and projection are suitably shaped to produce axial movement of the intermediate pinion on rotation of the primary pinion.

Referring to the drawing, the drive transmission mechanism includes a primary pinion 2 located on a shaft 4 which is rotatably mounted in a casing 6 by a ball-bearing assembly 8 and a cone assembly 10. The cone assembly includes a conical bearing either needle or plane to allow the cone of the assembly to rotate freely in its screwed adaptor. The shaft 4 has a coupling 12 mounted at one end outside the casing 6.

An intermediate pinion 14 and a gear wheel 16 are located on a tubular support 17. This support 17 is mounted on a shaft 18 which is fixed both axially and rotationally in the casing 6. The support 17 has a bush in its bore which allows free rotational and translational movement of the support 17 relative to the shaft 18.

The intermediate pinion 14 meshes with the primary pinion 2, and the gear wheel 16 meshes with a secondary pinion 20. This secondary pinion 20 is fixedly mounted on a shaft 22 which is rotatably mounted in the casing 6 by bearing assemblies 24 and 26. A coupling 28 is mounted on one end of the shaft 22 outside the casing 6.

A generally helical cam recess 30 extends circumferentially around the support 17, and a conical peg 32 is mounted on the inner wall of the casing 6 to project into the cam recess 30.

The teeth of the primary pinion 2 engage corresponding teeth on the intermediate pinion 14, and teeth on the gear wheel 16 engage corresponding teeth on the secondary pinion 20. As shown in the drawing, both sets of mutually engaging teeth are helical.

The drive transmission mechanism is mounted in the steering column assembly of a vehicle between the steering wheel and the actual steering gear. The vehicle steering column is formed in two parts, namely, an upper and a lower part. The upper part has one end connected to the coupling 12 and its other end connected to the steering wheel; and the lower part has its upper end connected to the coupling 28 and its lower end connected to the steering gear.

Rotation of the vehicle steering wheel rotates the shaft 4 and hence the primary pinion 2 which effects rotation of the intermediate pinion 14 and hence the support 17. This rotation of the support 17 causes the cam recess 30 to rotate. The resultant interaction of the cam recess 30 and peg 32 effects translational movement of the support 17 and hence the gear wheel 16 in dependence upon the shaping of that part of the cam recess 30 which receives the peg 32 during rotation of the shaft 18. This axial movement of the support 17 and hence the intermediate pinion 14 and gear wheel 16, causes the secondary pinion 20 to rotate at a speed which is greater or less than that which would be achieved solely by the rotation of the gear wheel 16. This difference in the secondary pinion rotation speed is dependent on the shape and hand of the cam recess 30 and the two sets of mutually engaging teeth on the pinions 2, 14, and 20 and the gear wheel 16. For example, if the cam recess 30 is of the same hand as the helix of the two sets of engaging teeth, then some of the rotational movement which would otherwise be transmitted to the secondary pinion 20 by the gear wheel 16 is lost. Therefore the secondary pinion 20 is caused to rotate at a rate which is less than that which would be achieved if the pinion drive were transmitted solely by rotation of the gear wheel 16. Conversely, if the helix of the cam recess 30 is of opposite hand to the helices of the two sets of mutually engaging teeth, then the secondary pinion 20 is caused to traverse at a rate greater than that which would result solely from rotation of the gear wheel 16.

It is this difference in pinion rotation from that which would be achieved solely by rotation of the gear wheel 16 which produces the required variation in movement ratio between the primary pinion 2 and the secondary pinion 20.

In the above-described drive transmission, both sets of mutually engaging teeth are helical. In modified mechanisms, either one of the two sets of mutually engaging teeth may be straight and parallel to the rotational axes of the shafts 4, 18 and 22. It will be appreciated that these modified arrangements provide a smaller variation in the movement ratio between the primary pinion 2 and the secondary pinion 20, than the mechanism in which both sets of mutually engaging teeth are helical.

The above-described drive transmission mechanism enables a vehicle to have a different movement ratio in the straight ahead position from the movement ratio when on the full steering lock in either direction.

It is to be understood that this illustrated mechanism can also be used with the upper part of the steering column connected to the coupling 28, and the lower part of the steering column connected to the coupling 12.

In an alternative construction, there is no tubular support 17 on the shaft 18. The intermediate pinion 14 and gear wheel 16 are fixedly mounted on the shaft 18, and the cam recess 30 is formed in the shaft 18. Opposite ends of the shaft 18 are rotatably mounted in respective tubular portions of the casing 6. The shaft 18 and casing tubular portions are dimensioned and arranged so that the shaft 18, and hence the intermediate portion 14 and gear wheel 16, can be moved axially within the casing 6.

What is claimed is:

1. A drive transmission mechanism comprising an axially fixed rotatable primary pinion, a secondary pinion, at least one intermediate pinion rotatable in response to the primary pinion to effect rotation of said secondary pinion, and cam means responsive to rotation of the primary pinion to effect axial displacement of said intermediate pinion during its rotation, said pinions providing at least one set of mutually engaging helical teeth through which rotary drive is transmitted from said primary pinion to said secondary pinion whereby said axial displacement of the intermediate pinion produces a variation in the movement between said primary and secondary pinions.

2. A mechanism as claimed in claim 1, in which the intermediate pinion engages the primary pinion, and further including a gear wheel drivingly connected to the primary pinion and which engages the secondary pinion.

3. A mechanism as claimed in claim 2, in which the primary pinion and intermediate pinion are coupled by mutually engaging straight teeth, and the gear wheel and secondary pinion are coupled by said mutually engaging helical teeth.

4. A mechanism as claimed in claim 2, in which the primary pinion and intermediate pinion are coupled by said mutually engaging helical teeth, and the gear wheel and secondary pinion are coupled by mutually engaging straight teeth.

5. A mechanism as claimed in claim 2, in which the primary pinion and the intermediate pinion, and the gear wheel and secondary pinion, are coupled by mutually engaging helical teeth.

6. A mechanism as claimed in claim 1 in which the cam means comprises a mutually engaging cam projection and means defining a cam recess which are relatively rotatable on rotation of the primary pinion.

7. A mechanism as claimed in claim 6, in which the means defining the cam recess is rotatable with the intermediate pinion.

8. A mechanism as claimed in claim 6, in which the cam recess is generally helical.

9. A mechanism as defined in claim 2 in which said intermediate pinion and said gear wheel have free rotational and translational movement on a shaft fixed in the mechanism casing.

10. A drive transmission for a steering mechanism for a vehicle comprising a rotatable steering input shaft and a rotatable steering output shaft for connection to steering gear, drive means drivingly interconnecting said input and output shafts to effect rotation of said output shaft upon rotation of said input shaft, said drive means comprising, an axially fixed primary pinion coaxial with and drivingly connected with said input shaft, a secondary pinion coaxial with and drivingly connected with said output shaft, and gear means interposed between said primary pinion and said secondary pinion, said gear means including at least one pinion gear having helical teeth and at least said primary pinion or said secondary pinion having helical teeth meshing with the helical teeth of said one pinion gear, and cam means responsive to rotation of said primary pinion to effect axial displacement of said one pinion gear to produce a variation in the movement ratio between said input and output shafts.

* * * * *